2,869,412
BUSHING

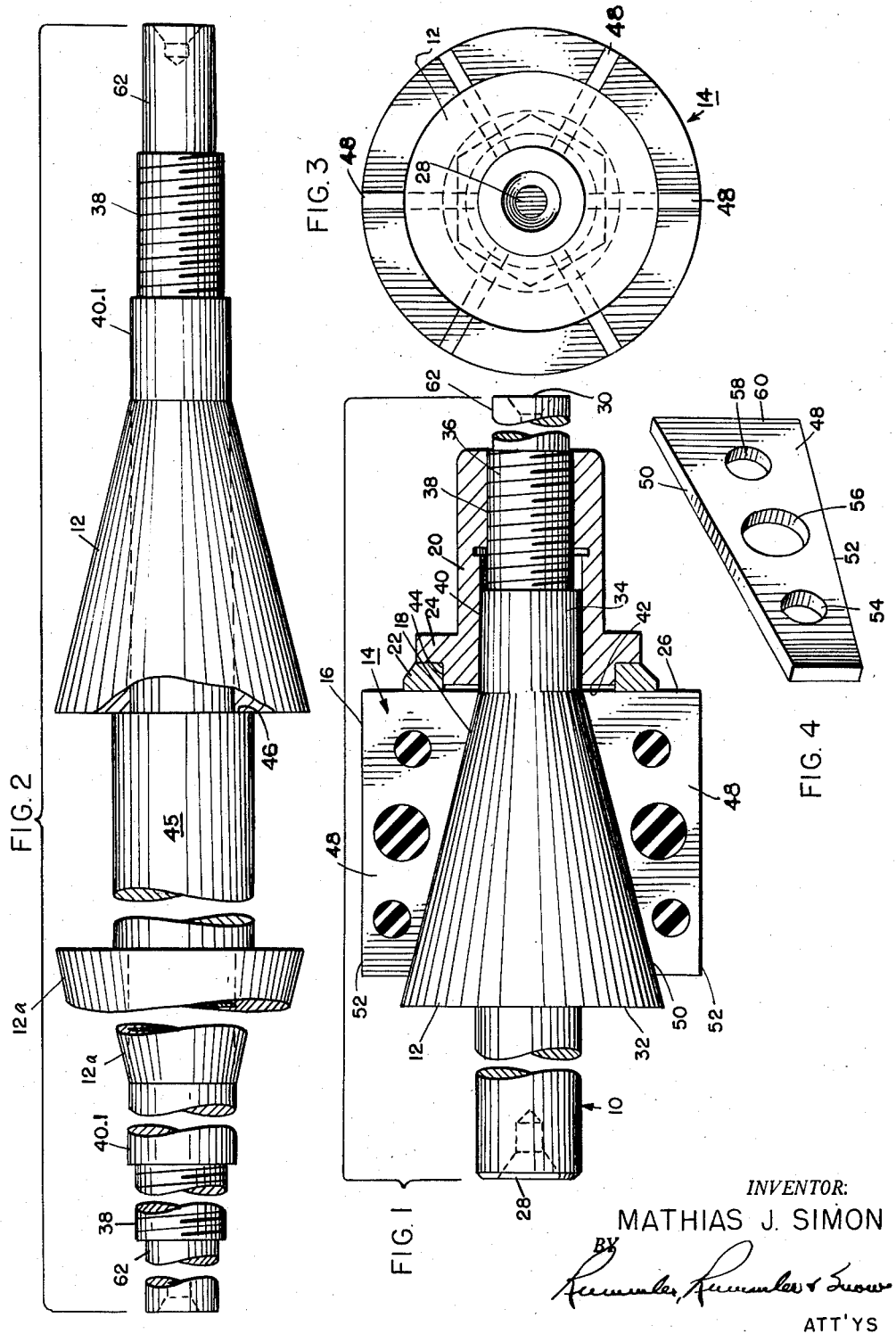

Mathias Joseph Simon, Chicago, Ill.

Application February 19, 1957, Serial No. 641,163

9 Claims. (Cl. 82—44)

This invention relates to an expanding arbor bushing for securing cylindrically hollow bodies, metal tubes, or the like on a lathe, and more particularly to an expanding arbor bushing having an arbor and outwardly tapering cone adjacent one or both ends thereof, and an expandible bushing whose interior bore is conical for complementary adjustable engagement with the cone of the arbor by means of a nut threaded on concentrically ground threads at the outer ends of the arbor.

Heretofore, radially expansible bushings for internally gripping a hollow or cylindrical article have been available, but these have been characterized by a high degree of complexity and have necessitated complicated adjustments which even so do not assure perfectly concentric mounting for the tube structure to be worked.

Accordingly, it is an object of the present invention to provide an expansible arbor bushing wherein an arbor has disposed adjacent an end thereof a conical camming element which tapers towards said end, and which serves to provide gradual and uniform radial adjustment of an expandible bushing when the bushing is moved gradually axially of the said arbor so as to be expanded by a complementary internal conical bore in snug engagement with the conical cam structure.

Another object of the invention is to provide an expandible bushing as described, having radially and axially disposed angularly spaced blades embedded within a resilient cylindrical matrix of neoprene or other suitable material comprising the bushing body, the blades having the outer edges thereof configured to engage securely within the object to be mounted as described and the bushing having a conically tapered central bore.

Another object of the invention is to provide an expandible arbor bushing as described, in which the said blades are provided with apertures adapted to receive therein the material of the bushing matrix so that they will be held for movement radially with the matrix as it is cammed over the conical structure of the arbor.

Another object of the invention is to provide an expanding arbor bushing as described, wherein cylindrical actuating means are threadedly secured at the outer end of the arbor for actuating the said arbor bushing axially of the conical structure on the arbor.

Another object of the invention is to provide an expandible arbor bushing as described wherein the said outer end of the arbor which carries a bushing driving member is ground concentrically to maintain the bushing perfectly square with the arbor at all times.

Another object of the invention is to provide a conical camming structure for the arbor as described, which may be formed either integrally with the arbor or separately therefrom, the separable cone being adapted for use on arbors or shafts of any length or affording selectively double-ended application of the said conical structure as desired.

Another object of the invention is to provide an arbor bushing having great simplicity of construction and economy of manufacture, as compared with bushings heretofore available, as well as extreme ease and accuracy in operation.

Other objects and advantages of the invention will become apparent as the description proceeds in accordance with the drawings, in which:

Figure 1 is a side elevational view partly in vertical section, of an expanding arbor bushing according to the invention;

Fig. 2 is a view with parts broken away of the arbor and a separable cone structure embodying the invention, corresponding to the view of Figure 1, and having the cone structure at each end of the arbor;

Fig. 3 is an end elevational view of the subject matter of Figure 1 taken from the left-hand end of Figure 1; and Fig. 4 is a perspective view of a gripping blade used with the expanding bushing of the invention.

Referring now to Figure 1, the expanding arbor bushing of the invention comprises a preferably cylindrical arbor 10, which may be of any length suitable for use with a lathe or the like, a conical cam 12 having a predetermined angle of taper toward one end of the arbor and coaxial with the arbor, a resilient, expandible bushing 14 having a peripheral cylindrical surface 16 and defining a conical bore 18 having an angle of taper which is substantially equal to the angle of taper of the cone 12, and an actuating or driving means for camming the bushing 14 over the conical camming structure 12, to expand the bushing 14 radially, comprising a sleeve 20 threadedly secured (as hereinafter set forth) on the arbor and engaging a washer or pressure distribution ring 22 disposed between an annular flange 24 of the sleeve 20 and the end or base 26 of the bushing 14 adjacent said sleeve. The ends of the arbor 10 are indented as at 28 and 30 in order to receive the bit structure of a lathe or the like, it being understood that these ends may be secured to the lathe chuck plate by suitable dogs or fastening means (not shown) in order to provide for transmission of torque from the lathe to the arbor.

In the embodiment shown in Figure 1, the base end 32 of the cone 12 has a diameter substantially greater than the diameter of arbor 10, while the portion of least diameter of the conical structure 12 is substantially the same as a relatively short cylindrical section 34 which, in turn, has a diameter preferably slightly greater than the diameter of a threaded end portion 36 of the arbor. The end portion 36 is ground concentrically with the axis so as to receive threaded portion 38 of the sleeve 20 thereon in concentric relationship, the forward portion of the sleeve 20 having a smooth walled counterbore 40 whose internal diameter is accordingly greater than the diameter of the portion 38 and of a size to slidably and firmly fit the section 34 in telescoping relationship such as to maintain the said concentricity.

Thus, the forward wall 42 of the sleeve can be used to actuate the bushing 14 by pressing directly against the end wall 26 thereof, these walls being at right angles to the axis of the arbor 10, and to drive the bushing 14 coaxially of the cone and arbor as described.

However, for even more accurate pressure distribution, it is desirable to exert the force available by manual rotation of the sleeve 20 intermediately of the surfaces 16 and 18 of the bushing 14, and to this end, a forward concentric cylindrical portion 44 is provided at the end of the sleeve 20 having a diameter adapted to receive relatively snugly thereon a pressure ring or washer 22. The portion 44 is somewhat less in diameter than the sleeve flange 24 and thus a shoulder is provided against which the washer 22 abuts. The concentric portion 44 and the said shoulder serve to hold the washer 22 square and concentric with the arbor axis.

The arbor 10 is preferably formed of steel and the cone 12 may be formed integrally therewith, as shown in Figure 1, or the cone may be formed separately from the arbor shaft and slidably received on an elongated portion 40.1 of less diameter than the main body 45 of the arbor as shown in Figure 2. In this last case the portion 40.1 provides a square shoulder 46, at its juncture with the main arbor body 45, against which the cone 12 abuts endwise and the length of the portion 40.1 is made such as to project sufficiently beyond the tip end of the cone to provide the guide bearing for the driving sleeve 20 as shown and described with respect to Figure 1.

The body structure of the bushing 14 is preferably formed of neoprene or other elastic material which may be expanded easily upon camming movement of the bushing over the cone 12 as described, and which will readily contract upon release of tension but in order to assure the integrity and uniformity of such expansion, as it is imparted to the peripheral cylindrical surface 16 by camming the bushing over the cone structure 12, a plurality of axially aligned, radially disposed blades 48 are embedded in the bushing 14 with their inner tapered edges 50 substantially coincident with the inner conical surface of the bore 18, and the outer edges 52 thereof substantially coincident with the outer cylindrical peripheral surface 16. The inner edges 50 of the bushing blades will afford relatively easy slidable movement of the bushing 14 along the cam 12, while the outer edges 52 of the blades provide gripping surfaces for the tube or other cylindrically hollow body which may be received on the bushing and held against relative angular rotation with respect thereto. Each of the blades 48 has formed therein a plurality of apertures 54, 56 and 58, and when the blades are disposed radially about a central axis in angularly spaced relation with each other, with the edge 50 corresponding to the taper of the surface of the bore 18, and in a suitable mold, the neoprene may be poured into the mold so as to form the integral solid body of the bushing and provide continuous circumferentially extending portions, through the apertures in the blades to maintain the said blades in the said predetermined alignment and relative position.

Thus, the bushing body is integrally formed circumferentially to afford a uniform radial expansion and contraction of the body and blades as the bushing is used.

It will also be appreciated that the base 26 of the bushing 14, which defines the smaller aperture for the conical bore 18, is reinforced by the end edges 60 of the blades 48 so that no disturbance or indentation of the surface of the base will occur by means of pressure exerted by the pressure distribution ring 22 against the said base 26; and the blades 48 and the cooperating apertures 54, 56 and 58 for receiving the resilient material of the main body portion 46 of the cone, serve to prevent compression of the material of the main body and consequent humping or unevenness of the peripheral cylindrical surface 16 as the bushing is driven onto the cone.

Referring now to Figure 2, the arbor 45 is shown in double-ended form with the cones 12 and 12a disposed adjacent the ends of the arbor so that elongate tubes to be machined may be disposed thereon, secured as hereinafter set forth. A bushing member such as the bushing 14 shown in Figures 1 and 2 is provided for each of the cones 12 and 12a in accordance with the above described concepts of the invention, and it will be appreciated that when the cones 12 and 12a are formed separately, they may be positioned in any desired axial relationship along the arbor as determined by the locations of the shoulders 46. Also, several of the cones and bushings associated therewith may be used in contiguous or double-headed relationship to afford even more secure gripping of a tubing, if so desired.

The manner of using the expanded grip or bushing of the invention will be easily understood from the foregoing description. The arbor 10 or 45 is first mounted on a standard lathe or other machine tool with the ends thereof secured by dogs or other suitable fastening means as described. These dogs may be secured on the shank end of the arbor or on the cylindrical portion 62 which extends beyond the threaded part of the arbor shaft and which has a slightly reduced diameter relative to the threaded sections 38. Thereupon, the bushing 14 at one end of the arbor is drawn up fairly tightly against the interior surface of the tube or hollow body to be positioned by rotation manually of the sleeve or internally threaded nut 20 which, as indicated, is guided in perfect concentricity to the axis of the arbor by the concentric threading 38 ground on the arbor, and the guiding relationship between the cylindrical section 34 of the arbor and the internal bore portion 40 of the sleeve 20. Thus, continued manual rotation of the nut or sleeve 20 serves to drive the bushing axially onto the cone and thereby expand the peripheral surface 16 of the bushing until the gripping edges 52 of the blades 48 are securely engaged against the internal wall of the body being mounted. Thereupon, the other bushing, when two are used, is drawn up against the interior of the body at the opposite end thereof in a corresponding manner, and after this has been done each of the nuts is given a final twist to assure the concentricity of the body, required in the most accurate machining operations, and at the same time prevent any possibility of rotation of the body on the respective bushings.

When the machined body is to be removed the bushing driving nuts 20 are unscrewed or retracted and the inherent elasticity of the bushing causes the bushing to slide outwardly on the cone and contract, thereby releasing the blades 48 from their grip on the machined body so that it can be drawn axially off the arbor.

The novel camming relationship between the cylindrical bushing of the invention the conical structure slidably received therein in complementary relationship assures that the foregoing steps may be accomplished with an ease which both reduces the time required for machining operations and substantially eliminates rejects due to faulty positioning of the element to be machined on the arbor.

Although I have herein described and set forth my invention with respect to certain specific principles and details thereof, it will be understood by those skilled in the art that these may be varied without departing from the spirit and concept of the invention as set forth in the hereunto appended claims.

I claim:

1. An expanding arbor bushing supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having a cylindrical form of exterior surface configuration of a predetermined diameter when the elastic material is in normal inert condition, said bushing having therein a conical bore tapered at an angle to the axis of its exterior surface substantially corresponding to the angle of taper of said conical surface and snugly fitting said camming structure in coaxial relationship, and means adapted to drive said bushing axially over said camming structure whereby to expand said bushing radially at a uniform rate along the entire length of said bushing for uniform engagement of said bushing with the interior surface of the hollow body to be held thereby.

2. An expanding arbor bushing supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having an exterior surface of cylindrical form and a predetermined diameter when the elastic material is in normal inert condition, said bushing having therein a conical bore tapered at an angle to the axis of said exterior surface substantially corresponding to the angle of taper of said conical surface and snugly fitting said camming structure in coaxial relationship, a plurality of wedge-shaped blades embedded in said elastic material bushing in circularly-spaced radial disposition with their opposite longitudinal edges respectively concentric with said conical bore and said exterior surface of said bushing, and means adapted to drive said bushing axially over said camming structure whereby to expand said bushing at a uniform rate for uniform edgewise engagement of said blades with the interior surface of the hollow body to be held thereby.

3. An expanding arbor bushing supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having an exterior surface of cylindrical form and a predetermined diameter when the elastic material is in normal inert condition, said bushing having therein a central conical bore tapered at an angle to the axis of said exterior surface substantially corresponding to the angle of taper of said conical surface and snugly fitting said camming structure in coaxial relationship, said bushing having a plurality of wedge-shaped blades embedded in said elastic material body in circularly-spaced radial disposition with their opposite longitudinal edges respectively concentric with said conical bore and said exterior surface of said bushing, and a sleeve having concentric threaded engagement with said arbor and positioned to apply pressure to the end of said bushing for driving said bushing over said camming structure whereby to radially expand said bushing uniformly into gripping relationship with the inner surface of a cylindrically hollow body to be mounted on said arbor.

4. An expanding arbor bushing supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having its exterior surface of cylindrical form and of a predetermined diameter when the elastic material is in normal inert condition, said bushing having therein a conical bore tapered at an angle to the axis of said exterior surface substantially corresponding to the angle of taper of said conical surface and snugly fitting said camming structure in coaxial relationship, a sleeve having concentric threaded engagement with said arbor and positioned to apply pressure to the larger end of said bushing at the small end of said bore for driving said bushing over said camming structure whereby to expand said exterior surface radially at a uniform rate along the entire length of said bushing for uniform engagement of said bushing with the interior surface of the hollow body to be held thereby, an annular flange on the inner end of said sleeve, said flange having an annular recess opposed to the larger end of said bushing, and a ring of axial thickness greater than the axial depth of said flange recess seated in said flange recess to abut the larger end of said bushing intermediate the bore and the exterior surface of said bushing.

5. An expanding arbor bushing for supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having an exterior surface of cylindrical form and of a predetermined diameter when the material is in normal inert condition, said bushing having therein a central conical bore tapered at an angle to the axis of said exterior surface substantially corresponding to the angle of taper of said conical surface and snugly fitting said camming structure in coaxial relationship, said bushing having a plurality of wedge-shaped blades embedded in said body of elastic material in circularly-spaced radial disposition with their opposite longitudinal edges respectively concentric with said conical bore and said exterior surface of said bushing, a sleeve having concentric threaded engagement with said arbor and positioned to apply pressure to the larger end of said bushing at the small end of said bore for driving said bushing over said camming structure whereby to expand said bushing uniformly and cam said blades into gripping relationship with the inner surface of a cylindrically-hollow body to be mounted on said arbor, an annular flange on the inner end of said sleeve, said flange having an annular recess opposed to the larger end of said bushing, and a ring of axial thickness greater than the axial depth of the flange recess seated in said flange recess to abut the larger end of said bushing intermediate the bore and the cylindrical surface of said bushing.

6. An expanding arbor bushing for supporting a hollow body on a lathe or the like, comprising an arbor adapted to be secured at each end upon a lathe, a camming structure disposed on said arbor coaxially thereof, said camming structure having a peripheral surface tapering conically, a bushing comprising a body of elastic material and having an exterior surface of cylindrical form and of a predetermined diameter when the elastic material is in normal inert condition, said bushing having therein a central conical bore tapered at an angle to the axis of said exterior surface substantially corresponding to the angle of taper of said conical surface and snugly fitting said camming structure in coaxial relationship, a cylindrical section of a diameter substantially equal to the smaller diameter end of said camming structure and integral therewith, a sleeve having concentric threaded engagement with said arbor and sliding engagement with said cylindrical section and adapted to apply pressure to the larger end of said bushing at the small end of said bore for driving said bushing over said camming structure whereby to expand said exterior surface at a uniform rate along the entire length of said bushing for uniform engagement of said bushing with the interior surface of the hollow body to be held thereby, an annular flange on the inner end of said sleeve, said flange having an annular recess opposed to the larger end of said bushing, and a ring of axial thickness greater than the axial depth of said flange recess seated in said flange recess to abut the end of said bushing intermediate the bore and the exterior surface of said bushing.

7. An expanding arbor bushing for supporting a hollow body on a lathe or the like, comprising an arbor adapted to be secured at each end upon a lathe, a camming structure disposed on said arbor coaxially thereof, said camming structure having a peripheral surface tapered conically, a bushing comprising a body of elastic material and having a cylindrical form of exterior surface of a predetermined diameter when the elastic material is in normal inert condition, said bushing having therein a central conical bore tapered at an angle to the axis of said exterior surface substantially corresponding to the angle of taper of said conical surface and snugly fitting said camming structure in coaxial relationship, a plurality of wedge-shaped blades embedded in said elastic material body of the bushing in circularly-spaced radial disposition with their opposite longitudinal edges respectively concentric with said conical bore and said exterior surface, a cylindrical section of a diameter substantially equal to the smaller diameter end of said camming structure and integral therewith, a sleeve having concentric threaded engagement with said arbor outwardly of said cylindrical section and sliding engagement with said cylindrical section and adapted to apply pressure to the larger end of said bushing at the small end of said bore for driving said bushing over said camming structure whereby to expand said bushing at a uniform rate along the entire length of said bushing for uniform engagement of said blades with the interior surface of the hollow body to be held thereby, an annular flange on the inner end of said sleeve, said flange having an annular recess opposed to the larger end of said bushing, and a ring of axial thickness greater than the axial depth of said flange recess seated in said flange recess to abut the larger end of said bushing intermediate the bore and exterior surface of said bushing.

8. In combination with an arbor, a cone adjacent each end of said arbor each gradually tapering toward the respective arbor ends, a pair of bushings each comprising a body of elastic material and each having a cylindrical form of exterior surface of predetermined diameter when the elastic material is in normal inert condition, each of said bushings having therein a conical bore tapered at an angle to the axis of the respective exterior surface substantially corresponding to the angle of taper of the respective cones and fitting snugly with said respective cones in coaxial relationship, and means operatively connected to the arbor for driving the respective bushings independently axially over the respective cones whereby to expand said bushings radially at a uniform rate along the entire respective lengths of said bushings for uniform engagement of said bushings with the interior surface of the hollow body to be held thereby.

9. In combination with an arbor, a cone adjacent each end of said arbor each gradually tapering toward the respective arbor ends, a pair of bushings each comprising a body of elastic material and each having a cylindrical form of exterior surface of predetermined diameter when the elastic material is in normal inert condition, each of said bushings having therein a conical bore tapered at an angle to the axis of the respective exterior surfaces substantially corresponding to the angle of taper of the respective cones and fitting snugly with said respective cones in coaxial relationship, and a sleeve having concentric threaded engagement with said arbor adjacent each of said bushings and positioned to apply pressure to the end of the respective bushing adjacent the small end of said bore for driving said bushing over the respective cone whereby to expand the respective bushing radially and uniformly into gripping relationship with the inner surface of a cylindrically hollow body to be mounted on said arbor.

References Cited in the file of this patent

UNITED STATES PATENTS

| 961,128 | Higgins | June 14, 1910 |
| 2,654,413 | Weidel | Oct. 6, 1953 |
| 2,659,260 | Layne et al. | Nov. 17, 1953 |

FOREIGN PATENTS

| 120,134 | Great Britain | Oct. 31, 1918 |